(12) United States Patent
Hikita et al.

(10) Patent No.: US 7,024,435 B2
(45) Date of Patent: Apr. 4, 2006

(54) DATA RECORDING DEVICE, DATA RECORDING METHOD, DATA REPRODUCING DEVICE AND DATA REPRODUCING METHOD

(75) Inventors: Jun Hikita, Kanagawa (JP); Tsutomu Iwaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 10/296,682

(22) PCT Filed: Mar. 29, 2001

(86) PCT No.: PCT/JP01/02661

§ 371 (c)(1),
(2), (4) Date: Jul. 21, 2003

(87) PCT Pub. No.: WO02/079992

PCT Pub. Date: Oct. 10, 2002

(65) Prior Publication Data

US 2004/0006579 A1 Jan. 8, 2004

(51) Int. Cl.
*G06F 17/30* (2006.01)

(52) U.S. Cl. .................. 707/205; 707/104.1; 707/204; 717/174

(58) Field of Classification Search .................. 707/1, 707/101, 104.1, 204, 205; 242/341; 360/134; 717/174, 177
See application file for complete search history.

(56) References Cited

U.S. PATENT DOCUMENTS 5,719,634 A * 2/1998 Keery et al. ................ 348/463
6,807,024 B1 * 10/2004 Yokota et al. ................ 360/60

FOREIGN PATENT DOCUMENTS

| JP | 63-229958 | 9/1988 |
|---|---|---|
| JP | 05-165423 | 7/1993 |
| JP | 10-171686 | 6/1998 |

OTHER PUBLICATIONS

Unix System V, Release 3.2, Programme's Reference manual, 1989 by AT&T. □□Section 3. Subroutines: "scanf, fscanf, sscanf(3S)". Section 4. File Formats: "cpio(4)".*

* cited by examiner

*Primary Examiner*—Jeffrey Gaffin
*Assistant Examiner*—Hassan Madmoudi
(74) *Attorney, Agent, or Firm*—Frommer Lawrence & Haug LLP; William S. Frommer

(57) ABSTRACT

When the size of a file which has been read out from a magnetic disc unit less than a predetermined value, a CPU the file onto a magnetic tape of a magnetic tape unit as an archive file of a standard form to which attribute information where its size is represented by octal numeral is added. On the other hand, when the size of the file is the predetermined value or more, the CPU records such a file onto the magnetic tape as an archive file of an expanded form to which attribute information where the size of the file is represented by hexadecimal numeral and including identification symbol indicating hexadecimal representation is added. Where the attribute information of the recorded archive file does not include identification symbol, the archive file is reproduced as a standard form. Where the attribute information includes identification symbol, the archive file is reproduced as an expanded form.

8 Claims, 5 Drawing Sheets

```
char    c_magic [CMS_LEN],
        c_dev [6],
        c_ino [6],
        c_mode [6],
        c_uid [6],
        c_gid [6],
        c_nlink [6],
        c_rdev [6],
        c_mtime [11],
        c_namesz [6],
        c_filesz [11],
        c_name [HNAMLEN];
```

FIG.4

DATA RECORDING DEVICE, DATA RECORDING METHOD, DATA REPRODUCING DEVICE AND DATA REPRODUCING METHOD

TECHNICAL FIELD

The present invention relates to a data recording apparatus and a data recording method for recording a large capacity file onto a recording medium, and a data reproducing apparatus and a data reproducing method for reproducing a large capacity file recorded on a recording medium.

BACKGROUND ART

As well known, in computer systems where a UNIX (Registered Trade Mark) is used as an OS, there are prepared a TAR (Tape Archive/Restore) command and a CPIO (CoPy Input/Output) command as commands (utility programs) for recording files onto a recording medium.

The TAR command is a command for transferring various files stored in, e.g., a magnetic disc unit to a magnetic tape unit as they are to record such files as backups. To the contrary, the CPIO command is a command for recording (copying) not only individual files but also all file systems by the so-called CPIO format in which they are collected into one archive (stack) file.

In a data recording method using the CPIO command, various files stored in the magnetic disc unit are caused to be backed up in the magnetic tape unit. In addition, such a data recording method is used when shifting files between different platforms, and can cope with a file size up to 8 gigabytes at the maximum in the system.

However, as symbolized by realization of broad band of internet, etc., recently there is a tendency such that capacity of data to be handled becomes gigantic. For example, as for moving picture data, etc. which exceeds 8 G bytes, it is impossible to cope with such picture data by the conventional data recording method using the CPIO command. For this reason, technologies capable of recording or reproducing even a file of size exceeding a conventional size in a manner in conformity with the format of the CPIO are expected.

DISCLOSURE OF THE INVENTION

The present invention has been made in view of such actual circumstances, and an object of the present invention is to provide a data recording apparatus, a data recording method, a data reproducing apparatus and a data reproducing method which can be used for recording and reproduction of even a file having the size which exceeds a conventional size in conformity with the CPIO format.

To achieve the above-described object, a data recording apparatus according to this invention comprises capacity judging means for judging whether or not the size of a file is a predetermined value or more, first file forming means for, in the case where the capacity judging means judges that the size of the file is less than the predetermined value, forming an archive file of a standard form to which attribute information where the size of the file is represented by octal numeral is added, second file forming means for, in the case where the capacity judging means judges that the size of the file is the predetermined value or more, forming an archive file of an expanded form to which attribute information where the size of the file is represented by hexadecimal numeral and including identification symbol indicating hexadecimal representation is added, and recording means for, in the case where the capacity judging means judges that the size of the file is less than the predetermined value, recording on a medium the archive file of the standard form formed by the first file forming means, while in the case where the capacity judging means judges that the size of the file is the predetermined value or more, recording on the medium the archive file of the expanded form formed by the second file forming means.

A data recording method according to the present invention comprises a capacity judgment step of judging whether or not the size of a file is a predetermined value or more, a first file formation step in which, in the case where it is judged at the capacity judgment step that the size of the file is less than the predetermined value, an archive file of a standard form to which attribute information where the size of the file is represented by octal numeral is added is formed, a second file formation step in which, in the case where it is judged at the capacity judgment step that the size of the file is the predetermined value or more, an archive file of an expanded form to which attribute information where the size of the file is represented by hexadecimal numeral and including identification symbol indicating hexadecimal representation is added is formed, and a recording step in which, in the case where it is judged at the capacity judgment step that the size of the file is less than the predetermined value, the archive file of the standard form formed at the first file formation step is recorded on a medium, while in the case where it is judged at the capacity judgment step that the size of the file is the predetermined value or more, the archive file of the expanded form formed at the second file formation step is recorded on the medium.

A data reproducing apparatus according to the present invention is adapted for reproducing an archive file recorded on a medium by the above data recording apparatus, and comprises judging means for judging whether or not attribute information added to the archive file recorded on the medium includes identification symbol indicating hexadecimal representation, first reproducing means for, in the case where it is judged by the judging means that the attribute information does not include identification symbol indicating hexadecimal representation, reproducing the archive file as an archive file of a standard form having attribute information represented by octal numeral, and second reproducing means for, in the case where it is judged by the judging means that the attribute information includes identification symbol indicating hexadecimal representation, reproducing the archive file as an archive file of an expanded form having attribute information represented by hexadecimal numeral.

A data reproducing method according to the present invention is one for reproducing archive file recorded on a medium by the above data recording method, and comprises a judgment step of judging whether or not attribute information added to an archive file recorded on the medium includes identification symbol indicating hexadecimal representation, a first reproduction step in which, in the case where it is judged at the judgment step that the attribute information does not include identification symbol indicating hexadecimal representation, the archive file is reproduced as an archive file of a standard form having attribute information represented by octal numeral, and a second reproduction step in which, in the case where it is judged at the judgment step that the attribute information includes identification symbol indicating hexadecimal representation, the archive file is reproduced as an archive file of an expanded form having attribute information represented by hexadecimal numeral.

A data recording apparatus according to the present invention comprises capacity judging means for judging whether or not the size of a file is a predetermined value or more, first file forming means for, in the case where the capacity judging means judges that the size of the file is less than the predetermined value, forming an archive file of a standard form to which attribute information where the size of the file is represented by octal numeral 11 byte length is added, second file forming means for, in the case where the capacity judging means judges that the size of the file is the predetermined value or more, forming an archive file of an expanded form to which attribute information where a specific character is set at leading byte and the remaining 10 bytes are used to represent the size of the file by hexadecimal numeral is added, and recording means for, in the case where the capacity judging means judges that the size of the file is less than the predetermined value, recording on a medium the archive file of the standard form formed by the first file forming means, while in the case where the capacity judging means judges that the size of the file is the predetermined value or more, recording on the medium the archive file of the expanded form formed by the second file forming means.

A data recording method according to the present invention comprises a capacity judgment step of judging whether or not the size of file is a predetermined value or more, a first file formation step in which, in the case where it is judged at the capacity judgment step that the size of the file is less than the predetermined value, an archive file of a standard form to which attribute information where the size of the file is represented by octal numeral 11 byte length is added is formed, a second file formation step in which, in the case where it is judged at the capacity judgment step that the size of the file is the predetermined value or more, an archive file of an expanded form to which attribute information where a specific character is set at leading byte and the remaining 10 bytes are used to represent the size of the file by hexadecimal numeral, and a recording step in which, in the case where it is judged at the capacity judgment step that the size of the file is less than the predetermined value, the archive file of the standard form formed at the first file formation step is recorded on a medium, while in the case where it is judged at the capacity judgment step that the size of the file is the predetermined value or more, the archive file of the expanded form formed at the second file formation step is recorded on the medium.

A data reproducing apparatus according to the present invention is adapted for reproducing an archive file recorded on a medium by the above data recording apparatus, and comprises judging means for judging whether or not a specific character is set at leading byte of attribute information added to the archive file recorded on the medium, first reproducing means for, in the case where it is judged by the judging means that the specific character is not set at the leading byte of the attribute information, reproducing the archive file as an archive file of a standard form having attribute information represented by octal numeral 11 byte length, and second reproducing means for, in the case where it is judged by the judging means that the specific character is set at the leading byte of the attribute information, reproducing the archive file as an archive file of an expanded form having attribute information where 10 bytes succeeding to the leading byte are represented by hexadecimal numeral.

A data reproducing method according to the present invention is one for reproducing an archive file recorded on a medium by the above data recording method, and comprises a judgment step of judging whether or not a specific character is set at leading byte of attribute information added to the archive file recorded on the medium, a first reproduction step in which, in the case where it is judged at the judgment step that the specific character is not set at the leading byte of the attribute information, the archive file is reproduced as an archive file of a standard form having attribute information represented by octal numeral 11 byte length, and a second reproduction step in which, in the case where it is judged at the judgment step that the specific character is set at the leading byte of the attribute information, the archive file is reproduced as an archive file of an expanded form having attribute information where 10 bytes succeeding to the leading byte are represented by hexadecimal numeral.

In this invention, such an approach is employed to judge whether or not the size of file is a predetermined value or more, whereby when the size of file is less than the predetermined value, an archive file of a standard form to which attribute information where the size of file is represented by octal numeral is added is formed to record such a file on a medium, while when the size of the file is the predetermined value or more, an archive file of an expanded form to which attribute information where the size of the file is represented by hexadecimal numeral and including identification symbol indicating hexadecimal representation is added is formed to record such a file on the medium. Accordingly, even in the case where the file size exceeds the conventional file size, it is possible to record such a file in conformity with the CPIO format.

In addition, in this invention, such an approach is employed to judge whether or not attribute information added to an archive file recorded on a medium includes identification symbol indicating hexadecimal representation, whereby in the case where such attribute information does not include identification symbol, the archive file is reproduced as an archive file of a standard form having attribute information represented by octal numeral, while in the case where such attribute information includes identification symbol, an archive file is reproduced as an archive file of an expanded form having attribute information represented by hexadecimal numeral. Accordingly, even in the case where the file size exceeds the conventional file size, it is possible to reproduce such a file in conformity with the CPIO format.

BRIEF DESCRIPTION OF THE DRAWINGS

FIG. 4 is a view showing structure of header HD.

BEST MODE FOR CARRYING OUT THE INVENTION

A data recording apparatus, a data recording method, a data reproducing apparatus and a data reproducing method according to this invention will now be described with reference to the attached drawings.

Figure 1:
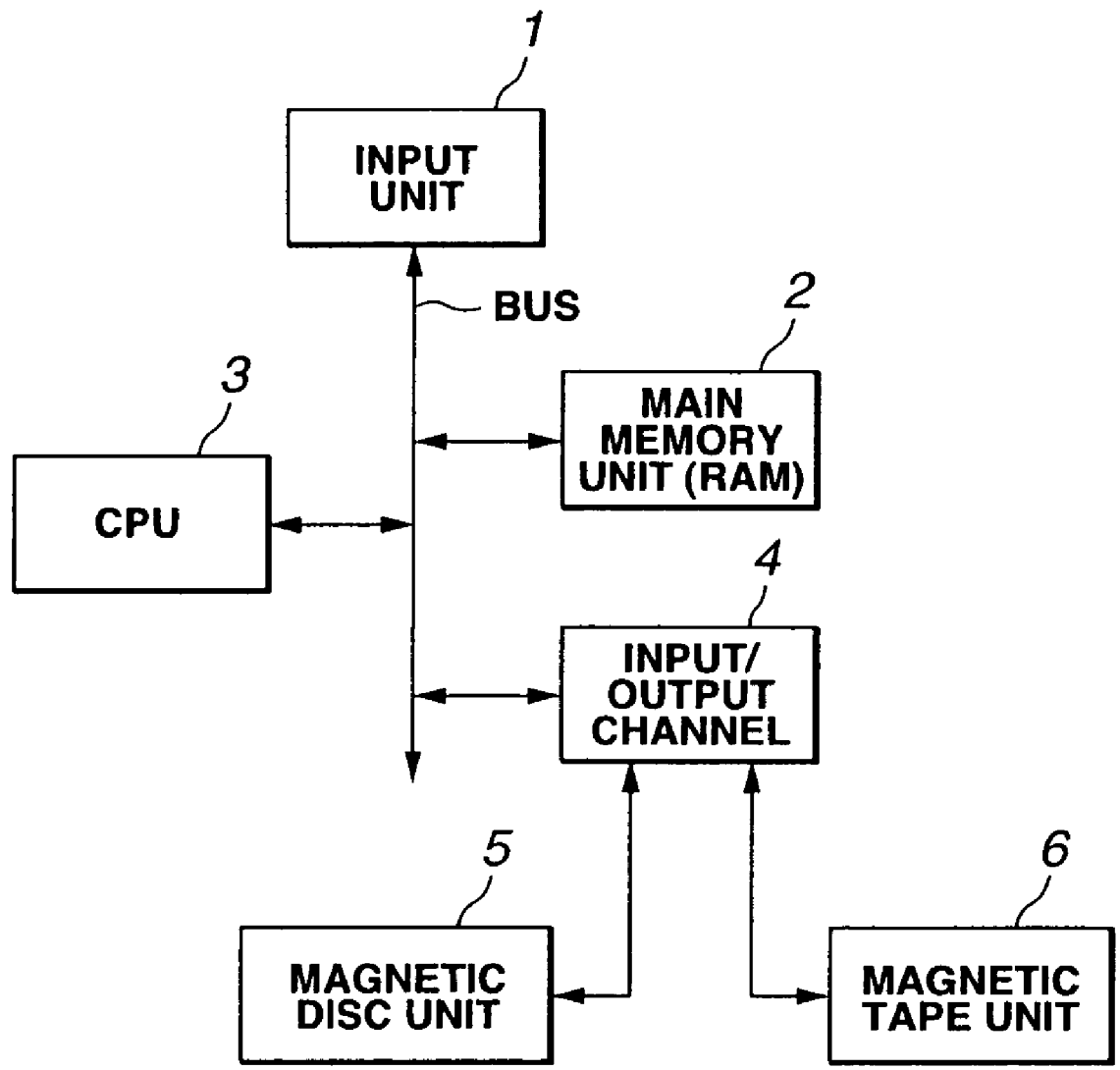
FIG. 1 is a block diagram showing configuration of a data recording apparatus to which this invention is applied.

FIG. 1 is a block diagram showing a configuration of the data recording apparatus to which this invention is applied.

As shown in this FIG. 1, an input unit 1 generates command input corresponding to keyboard operation or event input corresponding to mouse operation. A main memory unit 2 is comprised of, e.g., a RAM, and comprises a system area for storing a set of UNIX (Registered Trade Mark) system programs and a work area used as a work area of a CPU 3. The CPU 3 executes any one of the set of system programs stored in the system area of the main memory unit 2 in accordance with command (or event input)) from the input unit 1 to control respective units of the apparatus.

For example, the CPU 3 is operative so that when command input (or event input) for starting recording processing program is delivered from the input unit 1, it reads out, from a magnetic disc unit 5, a file to be recorded which is designated by command input (or event input) to store such a file into the work area of the main memory unit 2 through an input/output channel 4, and converts, in that work area, the file to be recorded into an archive file of CPIO format. Further, the archive file thus generated is read out from the work area and is transferred to a magnetic tape unit 6 through the input/output channel 4.

Figure 2:
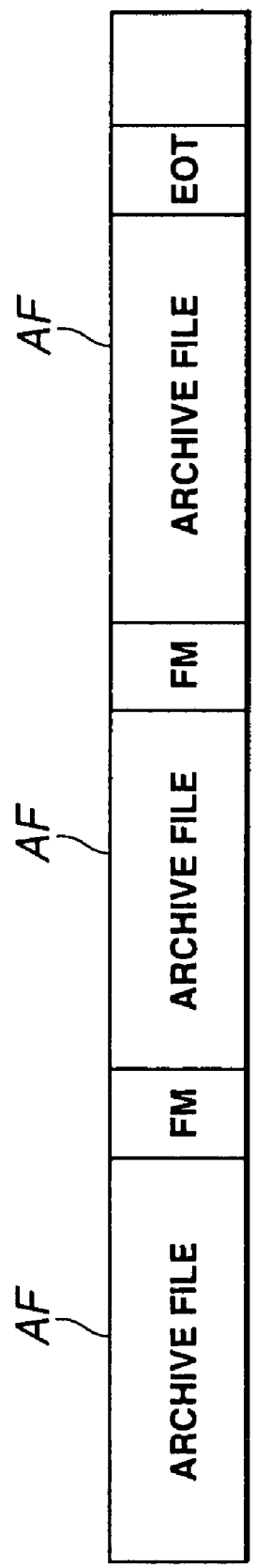
FIG. 2 is a view for explaining recording format.

At the magnetic tape unit 6, an archive file AF is recorded onto a magnetic tape by the recording format shown in FIG. 2. Namely, respective archive files AF are sequentially recorded by CPIO format where file mark FM for identifying a file is added at the back end in a user area of the magnetic tape, wherein data EOT indicating tape end is provided at the tape trailing end.

Figure 3:
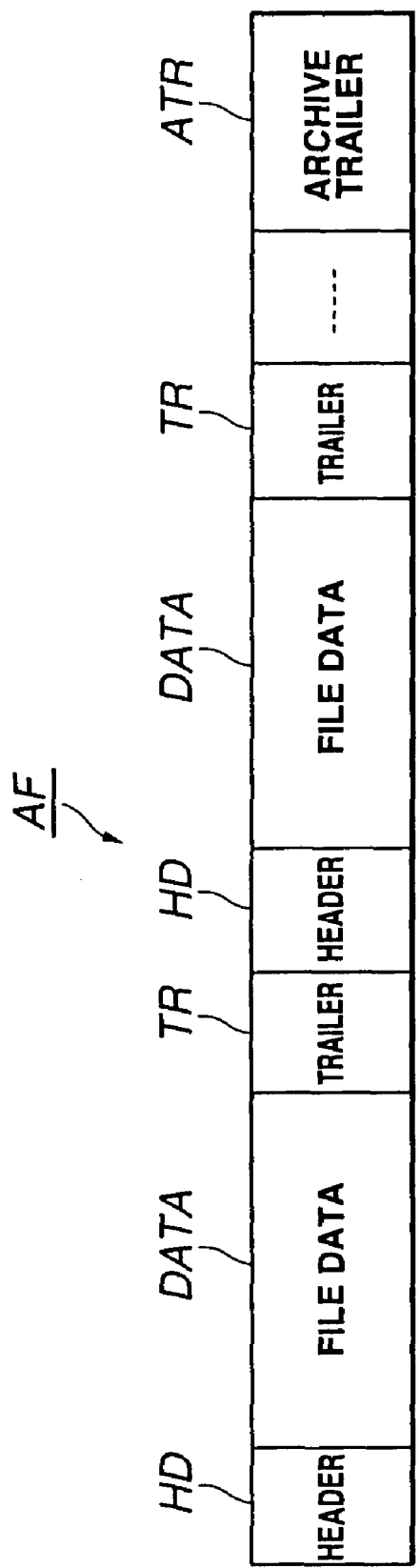
FIG. 3 is a view showing configuration of archive file AF.

The archive file AF of CPIO format is a file obtained by collecting plural files into one file. In a more practical sense, as shown in FIG. 3, such a archive file has a form in which headers HD and trailers TR are respectively added before and after respective file data DATA to carry out management of respective file contents and archive trailer ATR is also added at the trailing end (termination) of the archive file AF itself to carry out management of the file content.

These header HD, trailer TR and archive trailer ATR have all the same structure. In those structures, by the form shown in FIG. 4, for example, file management items such as a file name and a file size, etc. are defined. In FIG 4 c_filesz [11] consists of 11 bytes and c_filesz [11] defines file size of file data DATA corresponding thereto. By the form shown in FIG. 4, ordinarily, management of the file size as far as 8, 589, 923, 591 bytes [[(8G-1)]] 8 gigabytes at the maximum which can be represented by octal numeral 11 bytes is carried out.

After the main point of this invention is described, operation of the data recording apparatus for recording data on the basis of this main point will be explained.

Initially, the main point of this invention resides in that, in the above-described $c_{filesz}$ [11], specific character (e.g., "X") except for "0" to "7" is set at the leading byte and the remaining 10 bytes are used to define file size by hexadecimal representation (notation). When such an approach is employed, it becomes possible to carry out management of the file size of capacity which can be represented by hexadecimal 10 bytes, i.e., 1, 099, 511, 627, 775 bytes (IT-1) at the maximum while maintaining form in conformity with CPIO format. The operation of the data recording apparatus for implementing such a processing will be explained with reference to FIG. 5.

Figure 5:
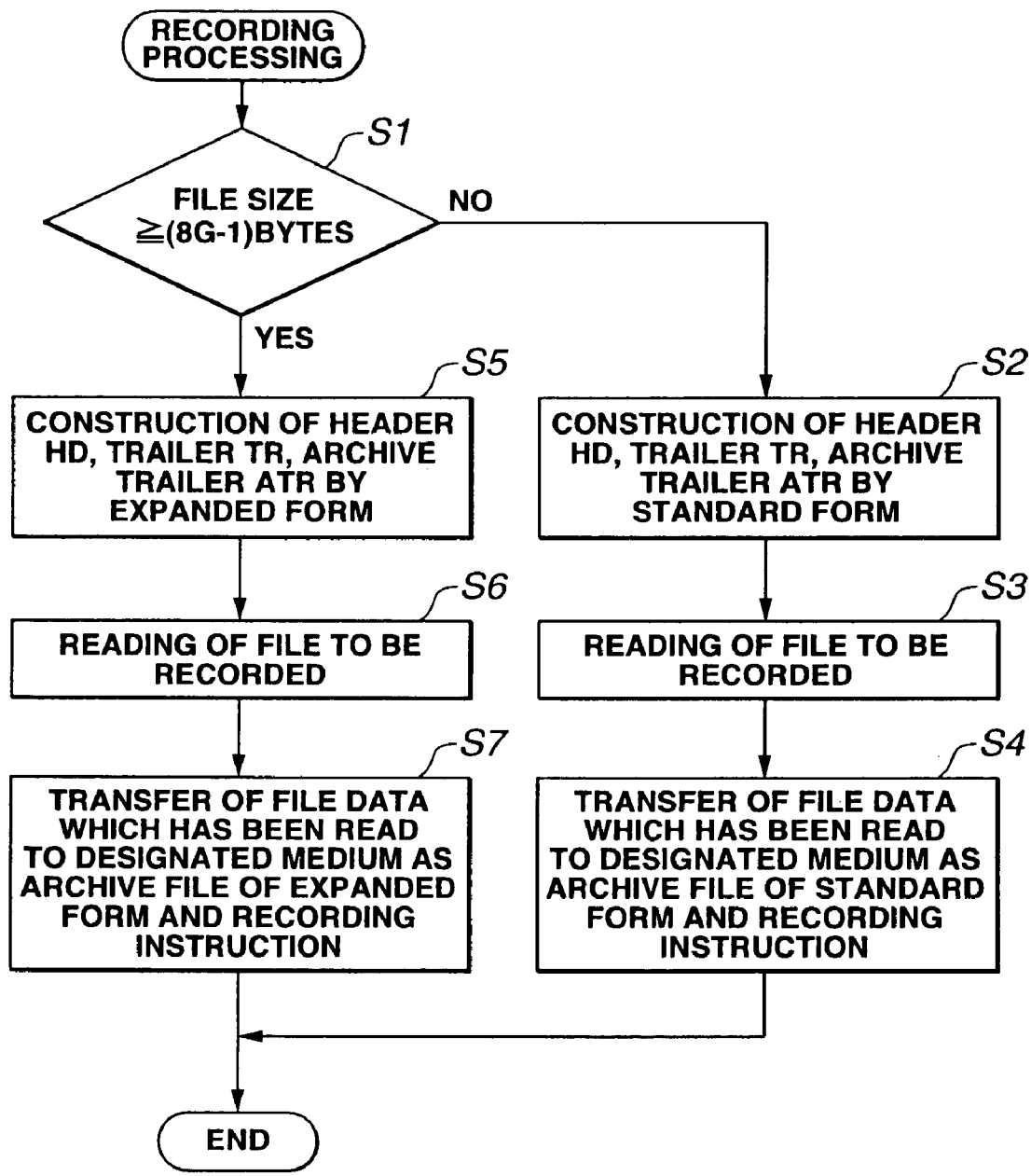
FIG. 5 is a flowchart for explaining operation of the data recording apparatus.

When command input (or event input) for starting recording processing program to which this invention is applied is delivered from the input unit 1, the CPU 3 executes recording processing shown in FIG. 5. At step S1, the CPU 3 judges whether or not the file size of file to be recorded which is designated by command input (or event input) is (8G-1) bytes or more. When the file size of the file to be recorded is less than (8G-1) bytes as the result of the judgment, judgment result of the step S1 is "NO". Thus, the CPU 3 causes the processing to proceed to step S2.

At the step S2, the CPU 3 constructs header HD, trailer TR and archive trailer ATR as the standard form where c_filesz [11] which defines the file size is represented by octal numeral.

Further, processing by the CPU 3 proceeds to step S3. Thus, the CPU 3 reads out, from the magnetic disc unit 5, a file to be recorded which is designated by command input (or event input) to store such a file into work area of the main memory unit 2 through the input/output channel 4. Subsequently, at step S4, the CPU 3 converts the file to be recorded which has been stored in the work area into an archive file AF of the standard form thereafter to read out this archive file AF of the standard form from the work area to transfer it to the magnetic tape unit 6 through the input/output channel 4, and carries out instruction to record it on the magnetic tape unit 6. Thus, the magnetic tape unit 6 records the archive file AF onto the magnetic tape by CPIO format in a manner similar to the prior art.

When the file size of the file to be recorded is (8G-1) bytes or more as the result of the judgment, judgment result of the step S1 becomes "YES". Thus, the CPU 3 allows the processing to proceed to step S5. At the step S5, the CPU 3 constructs header HD, trailer TR and archive trailer ATR as the expanded form where specific character (e.g.,"X") except for "0" to "7" is set at the leading byte of c_filesz [11] which defines the file size and the remaining 10 bytes are used to defines the file size by hexadecimal numeral.

Further, at step S6, the CPU 3 reads out, from the magnetic disc unit 5, a file to be recorded which is designated by command input (or event input) to store such a file into the work area of the main memory unit 2 through the input/output channel 4. Subsequently, the CPU 3 converts, at step S7, the file to be recorded which has been stored in the work area into an archive file AF of the expanded form thereafter to read out this archive file AF of the expanded form from the work area to transfer such a file to the magnetic tape unit 6 through the input/output channel 4, and to carry out instruction to record it on the magnetic tape unit 6. Thus, the magnetic tape unit 6 records the archive file AF of the expanded form in conformity with the CPIO format onto the magnetic tape.

As described above, in accordance with this invention, when the file size of a file to be recorded is less than 8 gigabytes, an archive file AF of the standard form representing c_filesz [11] which defines the file size by octal numeral is formed and is recorded. On the other hand, when the file size is the 8 gigabytes, or more, an archive file AF of the expanded form where specific character (e.g., "X") except for "0" to "7" is set at the leading byte of c_filesz [11] which defines the file size, and the remaining 10 bytes are used to represent the file size by hexadecimal numeral is formed and is recorded. Accordingly, the data recording apparatus to which this invention is applied can record the archive file AF in conformity with the CPIO format even if the file size exceeds a conventional file size.

On the other hand, the data reproducing apparatus for reading out an archive file AF recorded on the recording medium by this invention has a function or a circuit to judge whether or not specific character (e.g., "X") is set at the leading byte of c_filesz [11] which defines the file size in header HD, whereby when specific character is not set, the archive file is read out as an archive file AF of the standard form, while when specific character is set, an archive file is read out as an archive file AF of the expanded form. The data reproducing apparatus thus constituted can reproduce the archive file AF in conformity with CPIO format even if the file size exceeds the conventional file size.

INDUSTRIAL APPLICABILITY

In the data recording apparatus and the data recording method according to this invention, whether or not the size of a file is a predetermined value or more is judged. When the size of the file is less than the predetermined value, an archive file of a standard form to which attribute information where the size of the file is represented by octal numeral is added is formed to record such a file onto a medium. On the other hand, when the size of the file is the predetermined value or more, an archive file of an expanded form to which attribute information where the size of the file is represented by hexadecimal numeral and including identification symbol indicating hexadecimal representation is added is formed to record such a file onto a medium. Accordingly, even when the size of the file exceeds a conventional file size, it is possible to record the archive file in conformity with the CPIO format.

Moreover, in the data reproducing apparatus and the data reproducing method according to this invention, whether or not attribute information added to the archive file recorded on the medium includes identification symbol indicating hexadecimal representation is judged. In the case where attribute information does not include identification symbol, t he archive file is reproduced as an archive file of the standard form having attribute information represented by octal numeral. On the other hand, in the case where attribute information includes identification symbol, an archive file is reproduced as an archive file of an expanded form having attribute information represented by hexadecimal numeral. Accordingly, even when the size of the file exceeds a conventional file size, it is possible to reproduce the archive file in conformity with the CPIO format.

Further, in the data recording apparatus and the data recording method according to this invention, whether or not the size of a file is a predetermined value or more is judged. When the size of the file is less than the predetermined value, an archive file of a standard form to which attribute information where the size of the file is represented by octal numeral 11 byte length is added is formed to record such a file onto a medium. On the other hand, when the size of the file is the predetermined value or more, an archive file of an expanded form to which attribute information where a specific character is set at leading byte and the remaining 10 bytes are used to represent the size of the file by hexadecimal numeral is added is formed to record such a file onto the medium. Accordingly, even when the size of the file exceeds a conventional file size, it is possible to record the archive file in conformity with the CPIO format.

In addition, in the data reproducing apparatus and the data reproducing method according to this invention, whether or not a specific character is set at leading byte of attribute information added to an archive file recorded on a medium is judged. When the specific character is not set at the leading byte, the archive file is reproduced as an archive file of a standard form having attribute information represented by octal numeral 11 byte length. On the other hand, when the specific character is set at the leading byte, the archive file is reproduced as an archive file of an expanded form having attribute information where 10 bytes succeeding to the leading byte are represented by hexadecimal numeral. Accordingly, even when the size of the file exceeds a conventional file size, it is possible to reproduce the archive file in conformity with the CPIO format.

What is claimed is:

1. A data recording apparatus comprising:
   capacity judging means for judging whether or not a size of a file is a predetermined value or more;
   first file forming means for, in the case where the capacity judging means judges that the size of the file is less than the predetermined value, forming an archive file of a first form to which attribute information where the size of the file is represented by octal numeral is added;
   second file forming means for, in the case where the capacity judging means judges that the size of the file is the predetermined value or more, forming an archive file of a second, larger form to which attribute information where the size of the file is represented by hexadecimal numeral and including identification symbol indicating hexadecimal representation is added; and
   recording means for, in the case where the capacity judging means judges that the size of the file is less than the predetermined value, recording on a medium the archive file of the first form formed by the first file forming means, while in the case where the capacity judging means judges that the size of the file is the predetermined value or more, recording on the medium the archive file of the second form formed by the second file forming means.

2. A data reproducing apparatus adapted for reproducing an archive file recorded on a medium by the data recording apparatus as set forth in claim 1, the data reproducing apparatus comprising:
   judging means for judging whether or not attribute information added to the archive file recorded on the medium includes identification symbol indicating hexadecimal representation;
   first reproducing means for, in the case where it is judged by the judging means that the attribute information does not include identification symbol indicating hexadecimal representation, reproducing the archive file as an archive file of a first form having attribute information represented by octal numeral; and
   second reproducing means for, in the case where it is judged by the judging means that the attribute information includes identification symbol indicating hexadecimal representation, reproducing the archive file as an archive file of a second form having attribute information represented by hexadecimal numeral.

3. A data recording method comprising:
   a capacity judgment step of judging whether or not a size of a file is a predetermined value or more;
   a first file formation step in which, in the case where it is judged at the capacity judgment step that the size of the file is less than the predetermined value, an archive file of a first form to which attribute information where the size of the file is represented by octal numeral is added is formed;
   a second file formation step in which, in the case where it is judged at the capacity judgment step that the size of the file is the predetermined value or more, an archive file of a second, larger form to which attribute information where the size of the file is represented by hexadecimal numeral and including identification symbol indicating hexadecimal representation is added is formed; and
   a recording step in which, in the case where it is judged at the capacity judgment step that the size of the file is less than the predetermined value, the archive file of the first form formed at the first file formation step is recorded on a medium, while in the case where it is judged at the capacity judgment step that the size of the file is the predetermined value or more, the archive file of the second form formed at the second file formation step is recorded on the medium.

4. A data reproducing method of reproducing archive file recorded on a medium by the data recording method as set forth in claim 3, the data reproducing method comprising:
a judgment step of judging whether or not attribute information added to an archive file recorded on the medium includes identification symbol indicating hexadecimal representation;
a first reproduction step in which, in the case where it is judged at the judgment step that the attribute information does not include identification symbol indicating hexadecimal representation, the archive file is reproduced as an archive file of a first form having attribute information represented by octal numeral; and
a second reproduction step in which, in the case where it is judged at the judgment step that the attribute information includes identification symbol indicating hexadecimal representation, the archive file is reproduced as an archive file of a second form having attribute information represented by hexadecimal numeral.

5. A data recording apparatus comprising:
capacity judging means for judging whether or not a size of a file is a predetermined value or more;
first file forming means for, in the case where the capacity judging means judges that the size of the file is less than the predetermined value, forming an archive file of a first form to which attribute information where the size of the file is represented by octal numeral 11 byte length is added;
second file forming means for, in the case where the capacity judging means judges that the size of the file is the predetermined value or more, forming an archive file of a second, larger form to which attribute information where a specific character is set at leading byte and the remaining 10 bytes are used to represent the size of the file by hexadecimal numeral is added; and
recording means for, in the case where the capacity judging means judges that the size of the file is less than the predetermined value, recording on a medium the archive file of the first form formed by the first file forming means, while in the case where the capacity judging means judges that the size of the file is the predetermined value or more, recording on the medium the archive file of the second form formed by the second file forming means.

6. A data reproducing apparatus adapted for reproducing an archive file recorded on a medium by the data recording apparatus as set forth in claim 5, the data reproducing apparatus comprising:
judging means for judging whether or not a specific character is set at leading byte of attribute information added to the archive file recorded on the medium;
first reproducing means for, in the case where it is judged by the judging means that the specific character is not set at the leading byte of the attribute information, reproducing the archive file as an archive file of a first form having attribute information represented by octal numeral 11 byte length; and
second reproducing means for, in the case where it is judged by the judging means that the specific character is set at the leading byte of the attribute information, reproducing the archive file as an archive file of a second form having attribute information where 10 bytes succeeding to the leading byte are represented by hexadecimal numeral.

7. A data recording method comprising:
a capacity judgment step of judging whether or not a size of a file is a predetermined value or more;
a first file formation step in which, in the case where it is judged at the capacity judgment step that the size of the file is less than the predetermined value, an archive file of a first form to which attribute information where the size of the file is represented by octal numeral 11 byte length is added is formed;
a second file formation step in which, in the case where it is judged at the capacity judgment step that the size of the file is the predetermined value or more, an archive file of a second, larger form to which attribute information where a specific character is set at leading byte and the remaining 10 bytes are used to represent the size of the file by hexadecimal numeral; and
a recording step in which, in the case where it is judged at the capacity judgment step that the size of the file is less than the predetermined value, the archive file of the first form formed at the first file formation step is recorded on a medium, while in the case where it is judged at the capacity judgment step that the size of the file is the predetermined value or more, the archive file of the second form formed at the second file formation step is recorded on the medium.

8. A data reproducing method of reproducing an archive file recorded on a medium by the data recording method as set forth in claim 7, the data reproducing method comprising:
a judgment step of judging whether or not a specific character is set at leading byte of attribute information added to the archive file recorded on the medium;
a first reproduction step in which, in the case where it is judged at the judgment step that the specific character is not set at the leading byte of the attribute information, the archive file is reproduced as an archive file of a first form having attribute information represented by octal numeral 11 byte length; and
a second reproduction step in which, in the case where it is judged at the judgment step that the specific character is set at the leading byte of the attribute information, the archive file is reproduced as an archive file of a second form having attribute information where 10 bytes succeeding to the leading byte are represented by hexadecimal numeral.

* * * * *